United States Patent [19]
Mori et al.

[11] Patent Number: 5,485,746
[45] Date of Patent: Jan. 23, 1996

[54] HOT-WIRE TYPE AIRFLOW METER HAVING A FLOW SMOOTHING CORE

[75] Inventors: Yukio Mori, Nagoya; Noriyasu Kihara, Chiryu; Takamitu Suzuki, Anjo, all of Japan

[73] Assignee: Nippondenso Co., Ltd., Kariya, Japan

[21] Appl. No.: 286,249

[22] Filed: Aug. 8, 1994

[30] Foreign Application Priority Data

Aug. 10, 1993 [JP] Japan .................................. 5-198355
Oct. 27, 1993 [JP] Japan .................................. 5-268769

[51] Int. Cl.⁶ .................................................. G01F 1/68
[52] U.S. Cl. .......................... 73/202; 73/118.2; 73/204.22
[58] Field of Search ........................ 73/118.2, 202, 73/202.5, 204.21, 204.22

[56] References Cited

U.S. PATENT DOCUMENTS

| | | | |
|---|---|---|---|
| 3,374,673 | 3/1968 | Trageser | 73/202 |
| 4,709,581 | 12/1987 | Nishimura et al. | |
| 4,856,328 | 3/1989 | Johnson | 73/204.21 |
| 5,201,216 | 4/1993 | Miyazaki et al. | 73/118.2 |
| 5,209,113 | 5/1993 | Sawada et al. | |

FOREIGN PATENT DOCUMENTS

4350338  12/1992  Japan.

Primary Examiner—Richard Chilcot
Assistant Examiner—Harshad Patel
Attorney, Agent, or Firm—Cushman, Darby & Cushman

[57] ABSTRACT

A hot wire type airflow meter of the present invention comprises a housing defining a main passage through which air passes, a central member supported in the main passage of the housing and having an inlet portion for taking in a part of air flowing through the main passage, a bypass passage communicating with the inlet portion, and an outlet portion for returning air passing through the bypass passage to the main passage, and sensing means disposed in the bypass massage for measuring the airflow rate in the bypass passage, wherein the bypass passage comprises an upstream side meander portion which has a meandering passage at an upstream side of the sensing means, a straight tube portion formed as a straight tube and accommodating the sensing means, and a downstream side passage communicating the straight tube portion with the outlet portion. The airflow having been introduced into the housing passes through the inlet portion, and the bypass passage comprising the upstream side meander portion, straight tube portion in which the sensing means is disposed, and the downstream side passage. Then, the airflow is returned from the outlet portion to the main passage. As the dust in the airflow is excluded at the meander portion, the deterioration of measuring accuracy due to dirt in the sensing means is prevented.

15 Claims, 6 Drawing Sheets

5,485,746

HOT-WIRE TYPE AIRFLOW METER HAVING A FLOW SMOOTHING CORE

BACKGROUND OF THE INVENTION

1. Field of the Invention

The present invention relates to an airflow meter of a hot-wire type, particularly for measuring intake airflow of an internal combustion engine.

2. Description of the Related Art

In an intake airflow meter of hot-wire type, a resistor for measuring flow velocity and a resistor for temperature compensation are disposed with respect to an air passage, heating current is controlled so that, for example, the temperature of the resistor for measuring flow velocity is set under a condition at a specified temperature, and the airflow rate is calculated on the basis of the amount of this heating current.

Such an intake airflow meter for an internal combustion engine is disposed in an air intake pipe communicated with the internal combustion engine, the upstream side thereof having an air cleaner installed therein or the like and the downstream side thereof communicating with the internal combustion engine. Because of this structure, deviations in airflow from upstream and effects caused by backfiring of the internal combustion engine from downstream directly affect the resistor for measuring airflow velocity. Additionally, pulses corresponding to the combustion cycle of the revolving internal combustion engine exist in the airflow, making highly accurate, stabilized airflow measurement difficult.

However, when unclean air flows in from upstream of such an airflow meter, the measurement portion provided with the resistor for airflow measurement and the resistor for temperature compensation is soiled, and deterioration in measurement accuracy may be caused.

SUMMARY OF THE INVENTION

In light of the above-described problems, it is an object of the present invention to provide a hot-wire airflow meter which can perform dependable flow rate measurement, and which ensures that fuel injection control and ignition timing control for a high-reliability internal combustion engine are performed reliably.

According to the present invention, a hot wire type airflow meter comprises a housing defining a main passage through which air passes, a central member supported in the main passage of the housing and having an inlet portion for taking in a part of air flowing through the main passage, a bypass passage communicating with the inlet portion, and an outlet portion for returning air passing through the bypass passage to the main passage, and sensing means disposed in the bypass passage for measuring the airflow rate in the bypass passage, wherein the bypass passage comprises an upstream side meander portion which has a meandering passage at an upstream side of the sensing means, a straight tube portion formed as a straight tube and accommodating the sensing means, and a downstream side passage communicating the straight tube portion with the outlet portion.

It is preferable that a throttle portion is formed in the main passage at a position corresponding to an upstream portion of the central member, and the inlet portion is formed at a downstream side of the throttle portion so as to be open over the entire circumference of the surface portion of the central portion.

According to the above configuration, airflow having been introduced into the housing passes through the inlet portion, and the bypass passage comprising the upstream side meander portion, straight tube portion in which the sensing means is disposed, and the downstream side passage. Then, the airflow is returned from the outlet portion to the main passage. As the dust in the airflow is excluded at the meander portion, the deterioration of measuring accuracy due to dirt in the sensing means is prevented.

BRIEF DESCRIPTION OF THE DRAWINGS

Other objects, features, and advantages of the present invention will become apparent from a study of the following detailed description with reference to the appended claims and drawings.

In the accompanying drawings.

DETAILED DESCRIPTION OF THE PREFERRED EMBODIMENTS

Figure 1:
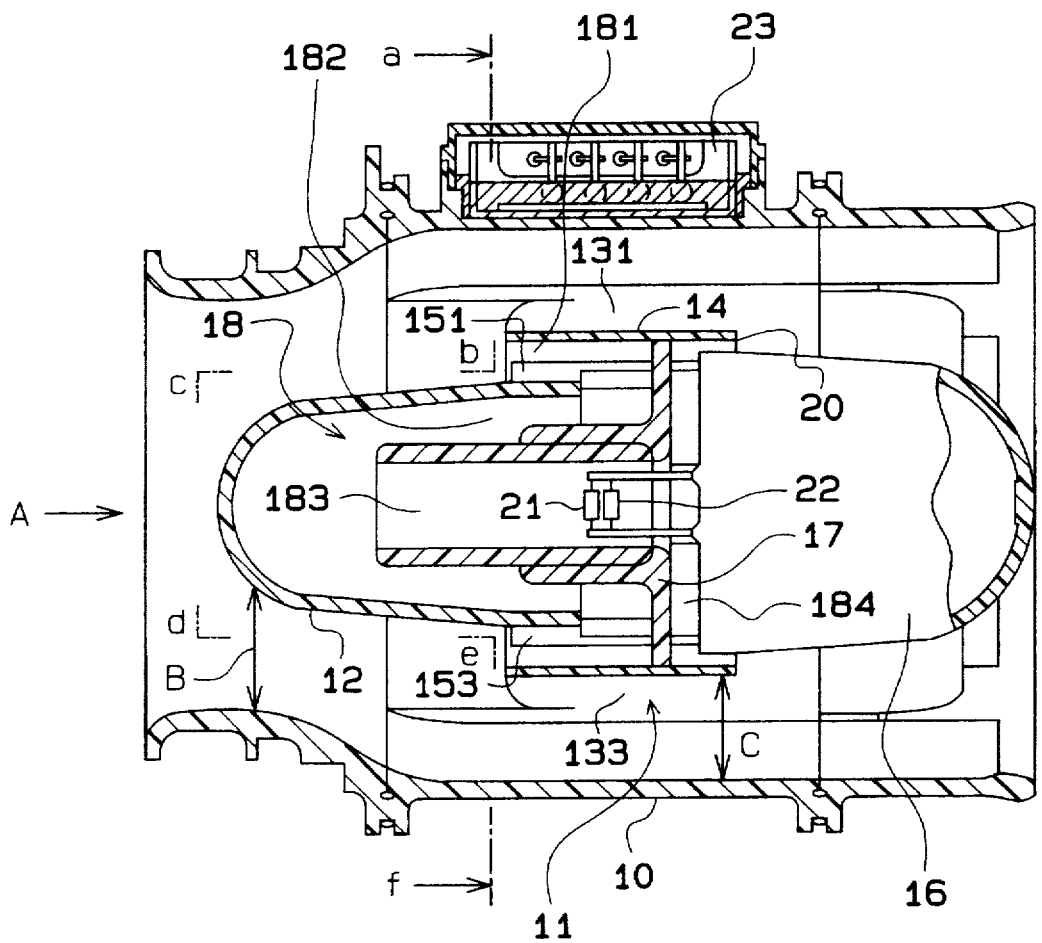
FIG. 1 is a cross-sectional view showing an airflow meter according to a first embodiment of the present invention.

A first embodiment of the present invention will be described hereinafter with reference to the drawings. FIG. 1 shows an airflow meter of a hot-wire type, which is disposed within an intake pipe of an internal combustion engine and provided with housing 10 of cylindrical shape. Airflow for measurement is introduced into housing 10 as shown by arrow A. Although not shown, an air cleaner communicates with the upstream side of this housing 10 either via a duct or integrally, and the downstream side is communicated with a combustion chamber of the internal combustion engine via a throttle valve.

Figure 2:
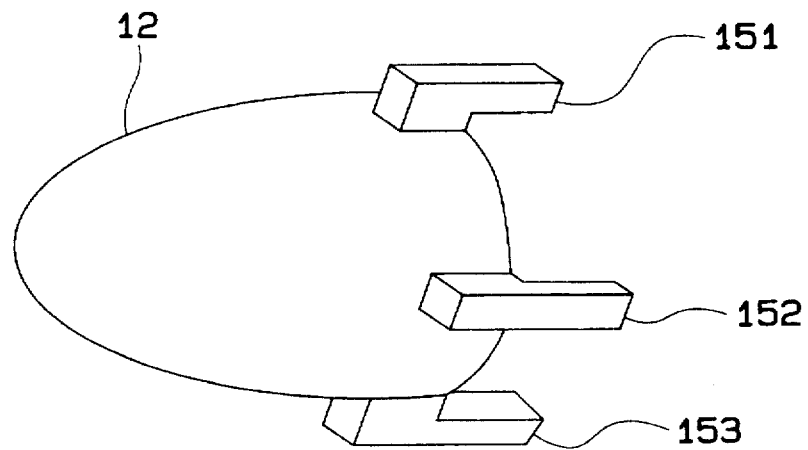
FIG. 2 shows a smoothing flow core used in the first embodiment.
Figure 3:
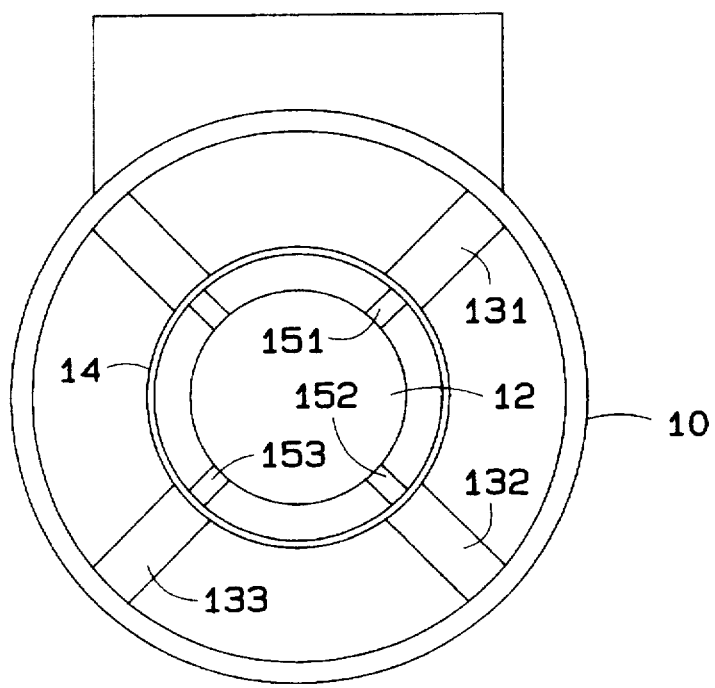
FIG. 3 is a side view taken along the line a-b-c-d-e-f of FIG. 1.

Housing 10 forms the main passage through which airflow for measurement passes, and central member 11 is disposed at a coaxial position within housing 10. This central member 11 includes a straightening core 12, central portion member 1.4, and downstream core 16. Moreover, bypass passage 18, which conveys a portion of the air flowing through the main passage of housing 10, is provided within central member 11. The materials comprising housing 10 and central member 11 are formed by means of injection molding of, for example, resin. Straightening core 12 of central member 11 is formed in a cup shape so as to close the proximal end, as shown in FIG. 2, and the closed proximal end potion is disposed within housing 10 to face the upstream side of the airflow, opposing an opening introducing air into housing 10. As shown in FIG. 3, smoothing flow core 12 is disposed on the axis of housing 10, and is fixedly supported by means of a plurality of ribs 131, 132, etc.

In detail, central flow portion member 14 of cylindrical shape is supported on the axis portion of the housing 10 by means of the ribs 131, 132, etc. Along with this, smoothing flow core 12 is supported on the axis portion of central flow portion member 14 by means of ribs 151, 152, etc. Ribs 151, 152, etc. are attached to the outer periphery of the downstream end of straightening core 12 as shown in FIG. 2, and ribs 151, 152, etc. are fit in so as to contact the inner peripheral surface of central flow portion member 14.

Additionally, housing 10 is structured so that the inlet portion for the air induction thereof constricts the diameter thereof, and the downstream side is configured such that the inner diameter expands progressively. Smoothing flow core 12 is disposed on this portion of expanded diameter, and a first throttle portion B is formed between the portion constricting the diameter of housing 10 and the proximal end portion of smoothing flow core 12.

Downstream core 16 is disposed coaxially on the downstream side of smoothing flow core 12. Partition wall 17 is disposed on the upstream end surface of downstream core 16, and the outer periphery of partition wall 17 is fit into the inner peripheral portion of central flow portion member 14. Smoothing flow core 12 and downstream core 16 are then joined by means of central flow portion member 14.

The interior of the end portion of the upstream side of smoothing flow core 12 is formed to be hollow. A spacing portion is provided between the surroundings of the opening end portion of the downstream side of smoothing flow core 12 and the partition wall 17 of the downstream core 16. Inlet 181, which is open circumferentially over substantially the entire circumference, is disposed between the inner peripheral surface of the central flow portion member 14, which is disposed so as to extend farther upstream than spacing portion, and the outer peripheral surface of smoothing flow core 12.

Bypass passage 18 disposed in the interior of central member 11 communicates with inlet 181. Bypass passage 18 includes upstream side meander portion 182, straight-tube portion 183, and downstream side flow path portion 184.

The flow path structure of bypass passage 18 will be described hereinafter.

The straight-tube portion 183 having a cylindrical shape is disposed on the center axis portion of smoothing flow core 12 integrally with partition wall 17. Straight-tube portion 183 is disposed in the interior of smoothing flow core 12 to protrude from partition wall 17 farther upstream than the downstream opening end surface of smoothing flow core 12, and is formed with an opening facing the upstream side. By means of this, the flow path from inlet 181 to the upstream side opening of straight-tube portion 183 is formed so as to meander, and thus upstream side meander portion 182 is formed.

Because of this, airflow flowing in via first throttle portion B from inlet 181 to bypass passage 18 first collides with partition wall 17, changes direction toward the inner diameter, and flows around and into the opening end surface in the downstream direction of smoothing flow core 12. It then flows toward the upstream side between the outer peripheral surface of straight-tube portion 183 and the inner peripheral surface of smoothing flow core 12. Then, the direction of airflow is again changed toward the downstream side at the upstream side of straight-tube portion 183, and the airflow moves toward the upstream side opening of straight-tube portion 183.

Downstream core 16, similar to the smoothing flow core 12, is formed by means of resin material to have a hollow shape and to have a small diameter facing the downstream side. The upstream side end surface is disposed opposite partition wall 17. A gap portion is provided between the upstream side end surface of downstream core 16 and partition wall 17 so as to expand in the direction of airflow, that is to say, in the direction perpendicular to axis of the housing 10. The downstream side end surface of straight-tube portion 183 passes through partition wall 17 portion and is open to the gap portion. The gap portion forms downstream side flow path portion 184. Accordingly, downstream side flow path portion 184 communicates with an outlet 20 formed between the downstream end of central flow portion member 14 with a cylindrical shape and the outer peripheral surface of downstream core 16.

Here, the airflow introduced from the upstream side opening of housing 10 passes through first throttle portion B, then passes through the outer peripheral passage of smoothing flow core 12 and is led downstream. Second throttle portion C is formed in this airflow passage between central flow portion member 14 and the inner peripheral surface of housing 10. Accordingly, the opening communicating with downstream side flow path portion 184 opens in correspondence with second throttle portion C. A vacuum force is generated in outlet 20 by means of the airflow speed at second throttle portion C. Air within the bypass passage 18 is drawn in via the vacuum, and flow of air corresponding to the airflow speed passing through housing 10 to the interior of bypass passage 18 is produced.

Within straight-tube portion 183, which is a portion of bypass passage 18, is disposed a sensor portion, which is an airflow meter of hot-wire type. The sensor includes resistor 21 for measuring flow velocity and resistor 22 for temperature compensation. Resistor 21 and resistor 22 comprising the sensor portion are supported by a member disposed so as to protrude from the end surface of downstream core 16. Resistors 21 and 22 are connected to a measurement circuit housed within a circuit chamber 23 formed integrally in the housing 10. The resistors 21 and 22 are made from thermal resistor elements, the resistance values of which change according to temperature.

Namely, a bridge circuit, including for example resistors 21 and 22, is formed, and heating current is supplied with respect to the resistor 21 to generate heat. In this case, temperature rises due to heat radiation by means of airflow acting upon resistor 21 are restricted. The speed of the airflow flowing in straight-tube portion 183 of bypass passage 18 is determined by means of one of the amount of heating current in order to ensure that, for example, the temperature of resistor 21 is maintained at a specified thermal condition, or by determining the heating time until resistor 21 rises to a specified thermal condition.

Figure 4:
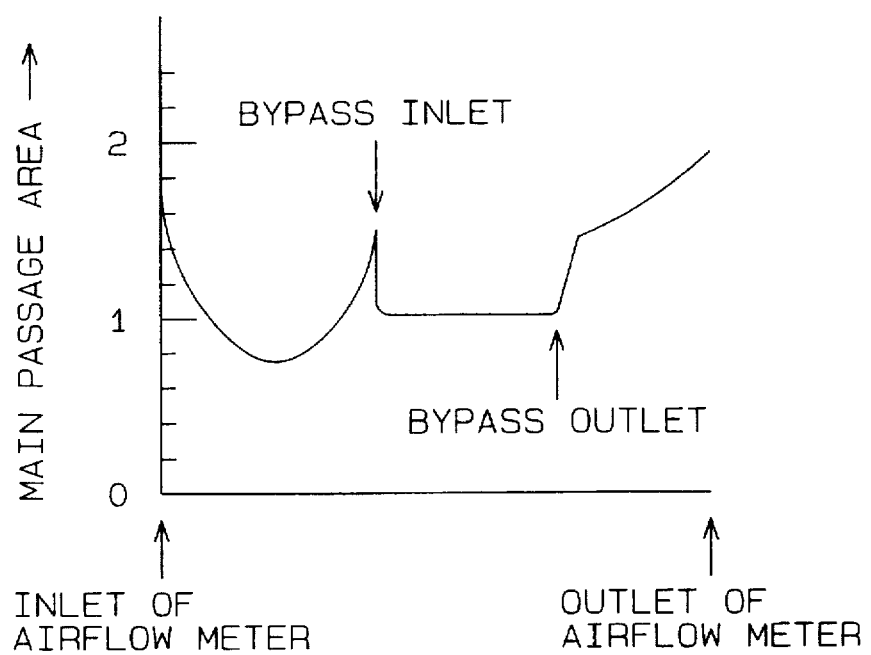
FIG. 4 shows characteristics of the main passage area of the meter of the first embodiment.

FIG. 4 shows characteristics of the main passage area of the measured airflow in an airflow meter structured in this manner. This drawing is referenced to the case where the main passage area of the outlet of the bypass passage 18 is taken to be "1."

In this airflow meter, a portion of air passing through an air cleaner and introduced as indicated by arrow A is led via upstream side meander portion 182 to the upstream side opening of straight-tube portion 183, passes through the hot-wire sensor composed of resistor 21 for measuring flow velocity and a resistor 22 for temperature compensation, is led via the downstream side flow path portion 184 to the outlet 20, and returns to the main passage. In this case, because the flow path area is constricted by second throttle portion C, airflow speed at outlet 20 increases and a vacuum is generated, a differential pressure is generated between inlet 181 of bypass passage 18 and outlet 20, and flow of air corresponding to the air flowing in the main passage of housing 10 is produced within bypass passage 18.

In such a measurement operation for airflow, in a case that air turbulence due to the air cleaner is introduced from the upstream side of housing 10, the flow of the turbulent air is smoothed at first throttle portion B on the upstream sides. The air then passes through the meander portion formed in smoothing flow core 12 within central member 11 and is introduced into straight-tube portion 183. It is possible to suppress, to a low level, fluctuations in flow velocity in the flow rate measurement portion where resistor 21 for measuring flow velocity and so on exist.

Even if deviant airflow is introduced from the upstream side, such deviant airflow is made uniform by first throttle portion B, and this airflow which has been made uniform is introduced into inlet 181 which is open circumferentially over substantially the entire circumference between the downstream end outer periphery of smoothing flow core 12 and central flow portion member 14. It is possible to suppress, to a low level, fluctuations in flow velocity in the flow rate measurement portion.

Furthermore, in a case that air containing impurities has been introduced as measurement airflow, these air impurities collected at meander portion 182 of bypass passage 18, which is upstream of the flow rate measurement portion. Any deterioration in measuring accuracy at the flow rate measurement portion can be avoided.

Similarly, downstream side flow path portion 184 is formed perpendicularly with respect to the axis on the downstream side of bypass passage 18, and so soiling of the flow rate measurement portion can be prevented. By selecting an appropriate position for inlet 181 opening and axial length for straight-tube portion 183, length of the bypass passage 18 can easily be changed. The extent of bypass flow during pulsing can be adjusted.

Figure 5:
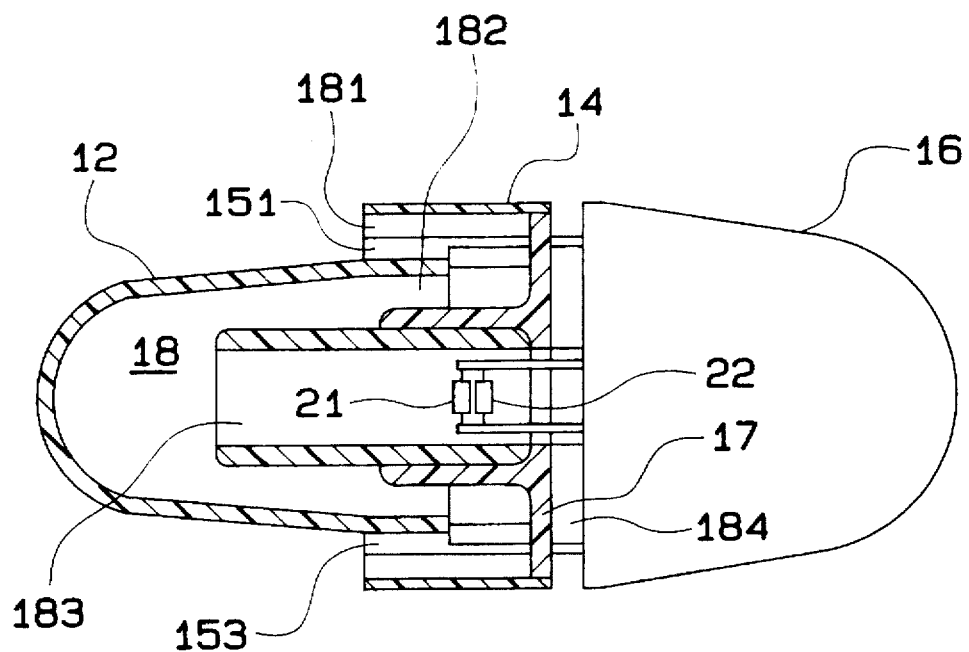
FIG. 5 shows main portion of a second embodiment of the present invention.

FIG. 5 shows a second embodiment which is basically similar to the first embodiment. In the first embodiment shown in FIG. 1, downstream side flow path portion 184 of bypass passage 18 is led to outlet 20 parallel to the main passage of airflow at the outer periphery of downstream core 16. According to the second embodiment, however, downstream side flow path portion 184 provided on a perpendicular surface with respect to the main passage of airflow is open toward the outer periphery without modification, and is formed as an airflow outlet. In this manner, even in a case that airflow from the downstream side is generated, the flow of air of the airflow measurement portion within bypass passage 18 is not affected. That is to say, even if backfiring occurs in an internal combustion engine to which the downstream side of housing 10 is connected, the effects thereof are reliably alleviated.

Figure 6:
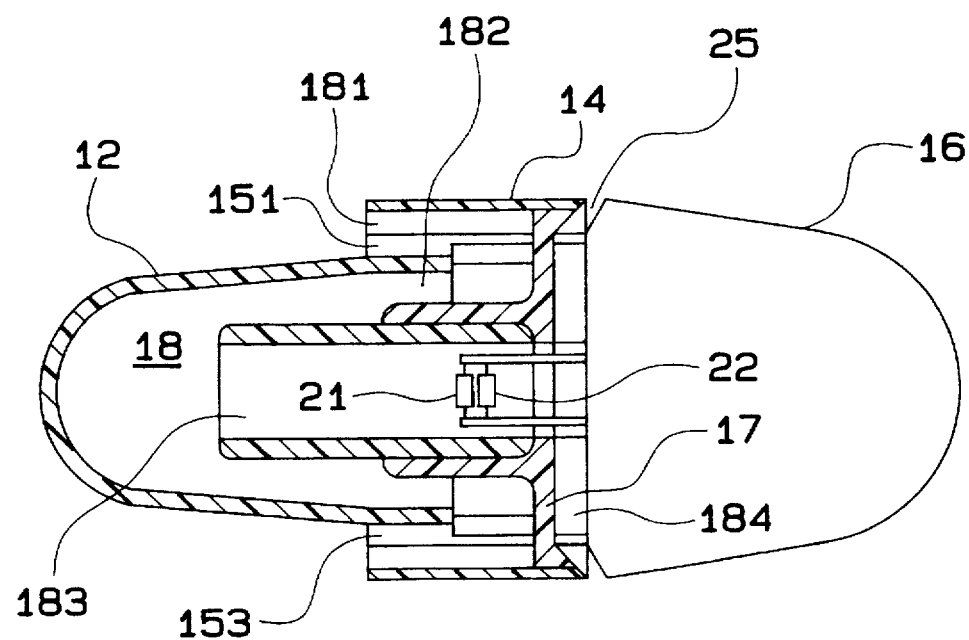
FIG. 6 shows main portion of a third embodiment of the present invention.

A third embodiment depicted in FIG. 6 attempts to reduce pressure loss with respect to the flow in the main passage in a case that an outlet for airflow from bypass passage 18 is formed in a direction intersecting the main passage of measurement airflow, as in the second embodiment. Downstream side flow path portion 184 provided on a perpendicular surface with respect to the main passage communicates with outlet 25 disposed diagonally with respect to this main passage.

Figure 7:
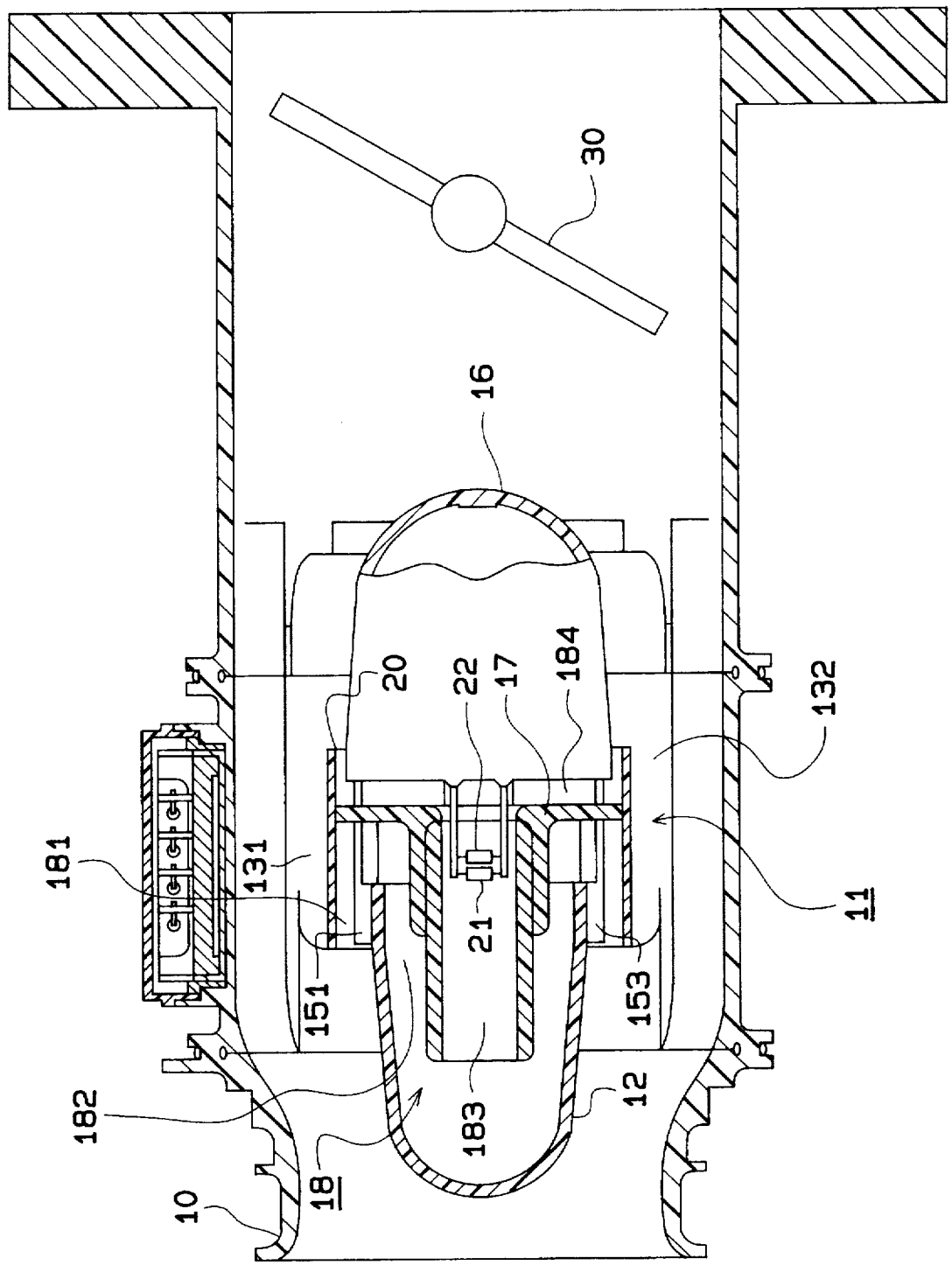
FIG. 7 shows a modification to which third embodiment is applied.

In a case of actual provision corresponding to an internal combustion engine, an airflow meter structure in the manner is disposed proximate to throttle valve 30, as, for example, shown in FIG. 7. In particular, it is conceivable that the airflow meter may be formed integrally with throttle valve 30 as shown in this drawing. In a case of actual passage of intake air, flow velocity distribution (pressure distribution) changes markedly due to the operation of throttle valve 30 upstream of throttle valve 30.

However, even in a case that throttle valve 30 has been provided nearby, if outlet 20 communicates with downstream side flow path portion 184 of bypass passage 18, outlet 20 is formed on the outer periphery of downstream core 16 so as to be open over the entire circumference with respect to the airflow main passage. Even if deviant flow velocity distribution exists in the airflow flowing in the main passage, the vacuum generating airflow with respect to the flow rate measurement portion is made uniform at the entire circumference of outlet 20. Because of this, airflow having substantially no difference with uniform flow (flow in the state with no throttle valve) having no deviant flow with respect to the flow rate measurement portion is made to be generated, and consequently it is possible to obtain stabilized flow rate measurement unaffected by deviant flow.

Figure 8:
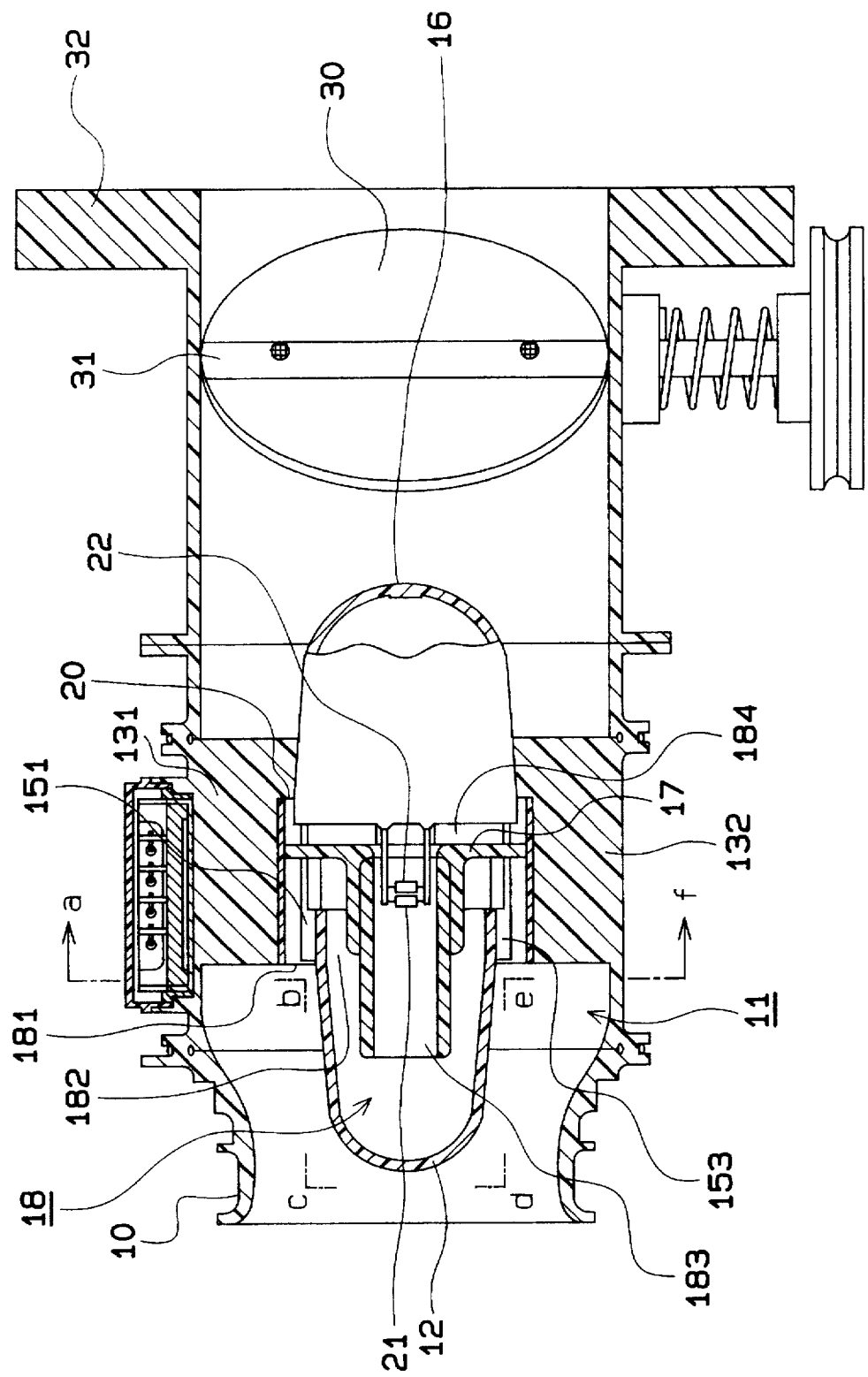
FIG. 8 shows main portion of a fourth embodiment of the present invention.
Figure 9:
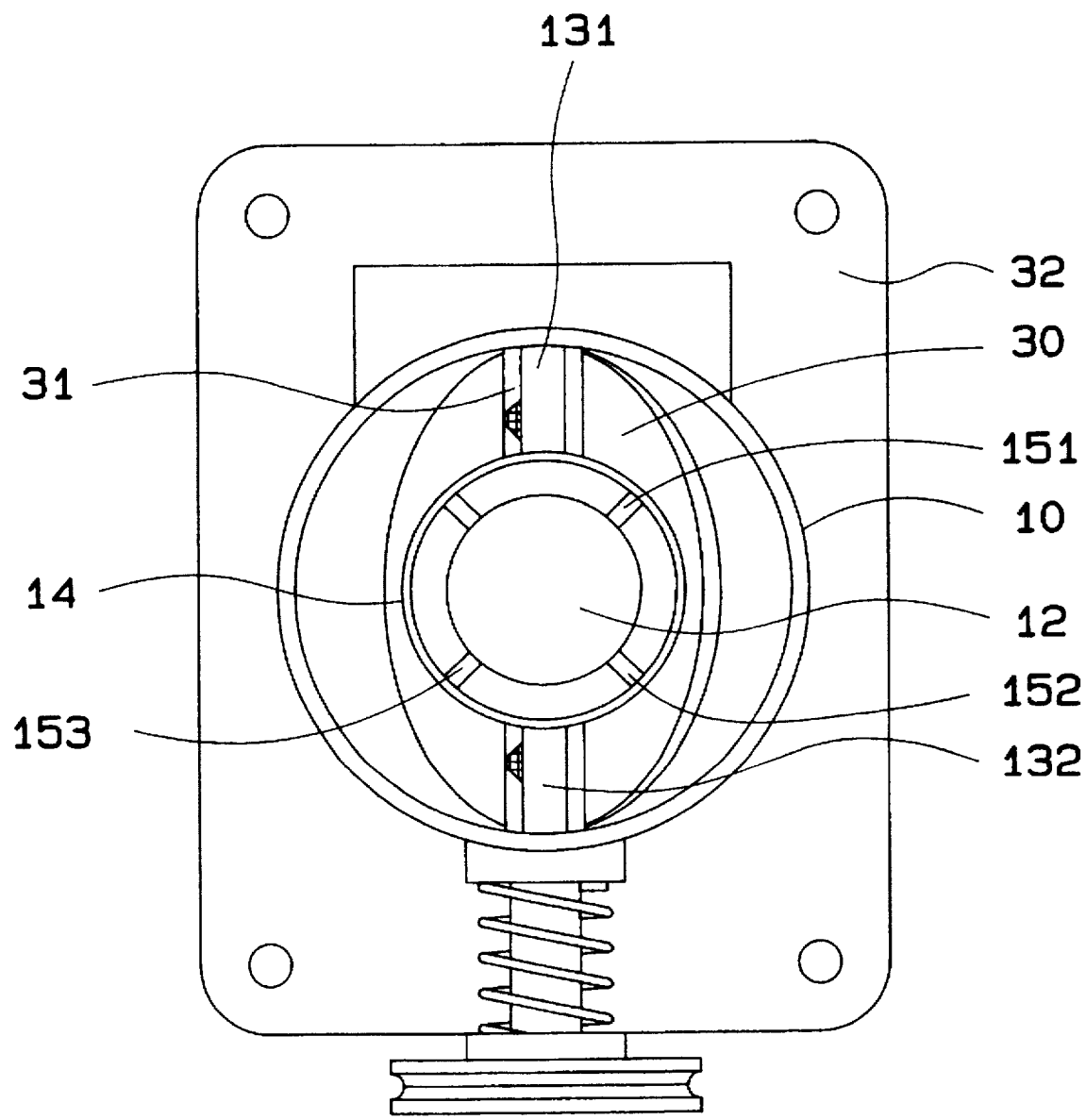
FIG. 9 is a side view taken along the line a-b-c-d-e-f of FIG. 8.

A fourth embodiment shown in FIGS. 8 and 9 is structured integrally with an airflow meter made of, for example, resin and a throttle body made of, for example, metal. Similar to the first through third embodiments, a central member 11 is supported by means of ribs within housing 10 of the airflow meter. However, in the fourth embodiment the central member 11 is supported by two ribs, rib 131 provided above and rib 132 provided below center member 11.

Throttle valve 30 is provided in the proximity of the downstream side of the downstream core 16 so that throttle valve shaft 31 and ribs 131 and 132 are parallel. Ribs 131 and 132 and throttle valve 30 and throttle valve shaft 31 are disposed so as to be positioned on substantially the same plane when the throttle valve 30 is between closed and fully open.

Accordingly, the airflow meter and throttle body are integrally structured by a method whereby a fixing member provided on the downstream end of housing 10 and a fixing member provided on the upstream end of throttle body 32 are bolted in the axial direction of housing 10 (or throttle body 32).

The airflow meter and throttle body are generally both connected by means of a duct. Normally, when connecting the airflow meter and duct, a method is employed whereby one end of the duct is made to cover the downstream end of the airflow meter, and the periphery thereof is tightened by means of a belt-shaped member. For this reason, in order to improve the tightening-withstanding rigidity in the circumferential direction, in the first through third embodiments four ribs are provided within housing 10 to support central member 11 as well as to assure rigidity over the entire periphery.

Additionally, changes in pressure of the flow on the downstream side of the ribs or throttle valve (including the throttle valve shaft) normally occurs because of the flow of air. This pressure change may lead to fluctuations in the flow velocity of the intake air and may cause reduced intake efficiency for the engine.

According to the fourth embodiment shown in FIGS. 8 and 9, by making the airflow meter and throttle body an integral structure as described above, there is no need to consider the tightening-withstanding rigidity of the airflow meter. Consequently, ribs supporting the central member 11 within the housing 10 can be eliminated. Furthermore, by providing throttle valve 30 so that throttle valve shaft 31 and ribs 131 and 132 are parallel in the proximity of the downstream side of the downstream core 16, pressure changes generated at the downstream side of the ribs is reduced, and the overall effects of the pressure changes are also reduced.

In the fourth embodiment, the central member is supported by two ribs, but this can be changed to one rib in accordance with the support strength. At this time as well, it is preferable that the throttle valve be disposed so that the rib and throttle valve shaft are parallel.

The above-described airflow meter according to the present invention can collect impurities by means of an upstream side meander portion even in the event that air containing impurities flows into a bypass passage from upstream. Consequently soiling of the sensor portion can be prevented, and electronic control of an internal combustion engine can be executed with greater reliability.

The present invention has been described in connection with what are presently considered to be the most practical and preferred embodiment. However, the present invention is not meant to be limited to those embodiments. Rather, the present invention is meant to include all modifications and alternative arrangements included within the spirit and scope of the appended claims.

What is claimed is:

1. A hot wire type airflow meter comprising:
a housing defining a main passage through which air passes;
a central member supported in said main passage of said housing, including a flow smoothing core having a shape which has a closed proximal end at an upstream side and spreads out in a downstream direction for introducing air smoothly, and having an inlet portion for taking in a part of air flowing through said main passage and being disposed downstream of said flow smoothing core, a bypass passage communicating with said inlet portion, and an outlet portion for returning air passing through said bypass passage to said main passage; and
sensing means disposed in said bypass passage for measuring an airflow rate in said bypass passage;
wherein said bypass passage comprises an upstream side meander portion which has a meandering passage at an upstream side of said sensing means, a straight tube portion formed as a straight tube and accommodating said sensing means, and a downstream side passage communicating said straight tube portion with said outlet portion.

2. A hot wire type airflow meter according to claim 1, wherein a first throttle portion is formed in said main passage at a position corresponding to an upstream portion of said central member, and said inlet portion is formed at a downstream side of said first throttle portion so as to open over an entire outer peripheral surface of said central member.

3. A hot wire type airflow meter according to claim wherein said downstream side passage is perpendicular to an axis of said housing forming said main passage.

4. A hot wire type airflow meter according to claim 3, wherein a second throttle portion is formed between said housing and said central member, said outlet portion being open immediately downstream of said second throttle portion, and said outlet portion is formed in parallel with an axis of airflow in said main passage.

5. A hot wire type airflow meter according to claim 3 wherein said outlet portion is formed so as to be perpendicular to an axis of airflow in said main passage.

6. A hot wire type airflow meter according to claim 3, wherein said outlet portion is formed so as to decline to an axis of airflow in said main passage.

7. A hot wire type airflow meter according to claim 2, wherein said first throttle portion is formed between said housing and said closed proximal end of said central member.

8. A hot wire type airflow meter according to claim 2, wherein said central member includes a cylindrical central flow portion member and is disposed in a parallel direction with said main passage, said central flow portion member includes an outer wall to form said inlet portion between an inner peripheral surface of said outer wall and an outer peripheral surface of said flow smoothing core, an inner tube disposed in said flow smoothing core, forming said straight tube portion and having an opening in a downstream direction, and a partition wall disposed in perpendicular direction with an airflow direction through said inlet portion and having an outer peripheral edge connecting to said inner surface of said outer wall, and a direction of air passing through said inlet portion is changed toward a center of said central member by said partition wall in said upstream side meander portion and air is further led to said inner tube through a passage between an inner peripheral surface of said smoothing flow core and an outer peripheral surface of said inner tube.

9. A hot wire type airflow meter according to claim 1, further comprising a throttle valve connected thereto as one-unit for controlling airflow in said main passage, wherein said outlet portion is open over the entire circumference of said main passage.

10. A hot wire type airflow meter according to claim 9, wherein said central member is fixedly supported in said housing by a rib, said throttle is connected at a downstream side and has a throttle valve shaft for rotatably supporting said throttle valve, and said throttle valve and said rib are disposed close to each other.

11. A hot wire type airflow meter according to claim 10, wherein said throttle valve and said rib are disposed on substantially same plane.

12. A hot wire type airflow meter comprising:
a housing defining a main passage through which air passes;
a central member fixedly supported in said main passage of said housing by a rib, including a flow smoothing core having a shape which has a closed proximal end at an upstream side and spreads out in a downstream direction for introducing air smoothly, and having an inlet portion for taking in a part of air flowing through said main passage and being disposed downstream of said flow smoothing core, a bypass passage communicating with said inlet portion, and an outlet portion for returning air passing through said bypass passage to said main passage;
sensing means disposed in said bypass passage; and
a throttle valve with a throttle shaft for rotatably supporting said throttle valve connected to said central member at a downstream side;
wherein said bypass passage comprises an upstream side meander portion which has a meandering passage at an upstream side of said sensing means, a straight tube portion formed as a straight tube and accommodating said sensing means, and a downstream side passage communicating said straight tube portion with said outlet portion, said throttle valve shaft and rib are disposed in parallel with each other, and said throttle valve and said rib are disposed close to each other.

13. A hot wire type airflow meter according to claim 12, wherein said throttle valve and said rib are disposed on substantially same plane.

14. A hot wire type airflow meter according to claim 12 wherein said first throttle portion is formed between said housing and said closed tip end of said central portion.

15. A hot wire type airflow meter according to claim 12, wherein said central member includes a cylindrical central flow portion member and is disposed in a parallel direction with said main passage, said central flow portion member includes an outer wall to form said inlet portion between an inner peripheral surface of said outer wall and an outer peripheral surface of said flow smoothing core, an inner tube disposed in said flow soothing core, forming said straight tube portion and having an opening toward downstream, and a partition wall disposed in a perpendicular direction with an airflow direction through said inlet portion and having an outer peripheral edge connecting to said inner surface of said outer wall, and a direction of air passing through said inlet portion is changed toward a center of said central member by said partition wall in said upstream side meander portion and air is further led to said inner tube through a passage between an inner peripheral surface of said smoothing flow core and an outer peripheral surface of said inner tube.

* * * * *